United States Patent
Shinnar et al.

(10) Patent No.: US 9,540,957 B2
(45) Date of Patent: Jan. 10, 2017

(54) THERMAL ENERGY STORAGE FOR COMBINED CYCLE POWER PLANTS

(75) Inventors: Reuel Shinnar, New York, NY (US); Hitesh Bindra, New York, NY (US); Shlomo Shinnar, legal representative, Great Neck, NY (US); Meir Shinnar, legal representative, Great Neck, NY (US)

(73) Assignee: The Research Foundation of the City University of New York, New York, NY (US)

( * ) Notice: Subject to any disclaimer, the term of this patent is extended or adjusted under 35 U.S.C. 154(b) by 378 days.

(21) Appl. No.: 14/115,174

(22) PCT Filed: Jan. 10, 2012

(86) PCT No.: PCT/US2012/020743
§ 371 (c)(1),
(2), (4) Date: Mar. 24, 2014

(87) PCT Pub. No.: WO2012/150969
PCT Pub. Date: Nov. 8, 2012

(65) Prior Publication Data
US 2014/0202157 A1    Jul. 24, 2014

Related U.S. Application Data

(60) Provisional application No. 61/481,312, filed on May 2, 2011.

(51) Int. Cl.
*F28D 17/00* (2006.01)
*F02C 6/14* (2006.01)
(Continued)

(52) U.S. Cl.
CPC . *F01K 3/02* (2013.01); *F01K 3/00* (2013.01); *F01K 13/02* (2013.01); *F01K 23/10* (2013.01);
(Continued)

(58) Field of Classification Search
CPC .... F28D 17/005; F28D 17/04; F28D 20/0056; F28D 2020/0017; F28D 2020/0086; Y02E 20/16; F01K 23/10; F01K 23/101; F01K 13/00; F01K 13/02; F02C 6/14
See application file for complete search history.

(56) References Cited

U.S. PATENT DOCUMENTS 3,974,642 A * 8/1976 Pacault ............... F01K 23/10
126/400
4,094,148 A * 6/1978 Nelson ............... F01K 3/00
60/39.182
(Continued)

FOREIGN PATENT DOCUMENTS

| DE | 10260992 A1 | 7/2004 |
| JP | H08260912 A | 10/1996 |
| WO | 2009082713 A1 | 7/2009 |

OTHER PUBLICATIONS

Janna, William. Engineering Heat Transfer, Second Edition. CRC Press, 1999. p. 192. Web. Dec. 4, 2015.*
(Continued)

*Primary Examiner* — Thomas Denion
*Assistant Examiner* — Xiaoting Hu
(74) *Attorney, Agent, or Firm* — Burns & Levinson LLP; Orlando Lopez (57) ABSTRACT

Thermal storage systems that preferably do not create substantially any additional back pressure or create minimal additional back pressure and their applications in combined cycle power plants are disclosed. In one embodiment of the method for efficient response to load variations in a combined cycle power plant, the method includes providing, through a thermal storage tank, a flow path for fluid exiting a gas turbine, placing in the flow path a storage medium comprising high thermal conductivity heat resistance media, preferably particles, the particles being in contact with each other and defining voids between the particles in order to facilitate flow of the fluid in a predetermined direction constituting a longitudinal direction, arrangement of the particles constituting a packed bed, dimensions of the particles and of the packed bed being selected such that a resultant back pressure to the gas turbine is at most a predetermined back pressure.

25 Claims, 4 Drawing Sheets

(51) Int. Cl.
*F28D 20/00* (2006.01)
*F01K 3/02* (2006.01)
*F28D 17/04* (2006.01)
*F01K 3/00* (2006.01)
*F01K 23/10* (2006.01)
*F01K 13/02* (2006.01)
*F02C 6/18* (2006.01)

(52) U.S. Cl.
CPC ............... *F01K 23/101* (2013.01); *F02C 6/14* (2013.01); *F02C 6/18* (2013.01); *F28D 17/005* (2013.01); *F28D 17/04* (2013.01); *F28D 20/0056* (2013.01); *F05D 2220/72* (2013.01); *F05D 2260/42* (2013.01); *F28D 2020/0086* (2013.01); *Y02E 20/16* (2013.01); *Y02E 60/142* (2013.01)

(56) References Cited

U.S. PATENT DOCUMENTS

| | | | | |
|---|---|---|---|---|
| 4,405,010 A | * | 9/1983 | Schwartz | F28D 20/0056 165/10 |
| 4,923,003 A | * | 5/1990 | Stenlund | F28F 1/42 165/154 |
| 5,896,747 A | * | 4/1999 | Antohi | B60H 1/3201 62/101 |
| 5,903,060 A | * | 5/1999 | Norton | F02G 5/02 237/8 D |
| 7,444,818 B1 | | 11/2008 | Brostmeyer | |
| 2005/0133202 A1 | * | 6/2005 | Jorgensen | F28D 7/024 165/103 |
| 2009/0121495 A1 | * | 5/2009 | Mills | F01K 3/00 290/4 D |
| 2009/0178409 A1 | * | 7/2009 | Shinnar | F01K 3/00 60/645 |
| 2009/0322089 A1 | | 12/2009 | Mills et al. | |
| 2010/0139631 A1 | * | 6/2010 | Geskes | F28F 1/40 123/568.12 |
| 2010/0176602 A1 | * | 7/2010 | Shinnar | F03G 6/04 290/1 A |
| 2010/0202582 A1 | | 8/2010 | Shinnar et al. | |
| 2012/0312496 A1 | * | 12/2012 | Howes | F01K 3/12 165/7 |
| 2014/0008033 A1 | * | 1/2014 | Howes | F28D 20/0056 165/10 |
| 2014/0299306 A1 | * | 10/2014 | Bindra | F28D 20/0056 165/200 |

OTHER PUBLICATIONS

International Search Report dated May 1, 2012 for International Application No. PCT/US12/20743.
Written Opinion dated May 1, 2012 for International Application No. PCT/US12/20743.

* cited by examiner

Fig. 1a

PRIOR ART

THERMAL ENERGY STORAGE FOR COMBINED CYCLE POWER PLANTS

CROSS-REFERENCE TO RELATED APPLICATIONS

This application is a U.S. national stage application under 35 U.S.C. 371 of co-pending International Application No. PCT/US12/20743 filed on Jan. 10, 2012 and entitled THERMAL ENERGY STORAGE FOR COMBINED CYCLE POWER PLANTS, which in turn claims priority to U.S. Provisional Patent Application No. 61/481,312 filed on May 2, 2011, which is incorporated by reference herein in its entirety for all purposes.

BACKGROUND

Figure 1A:
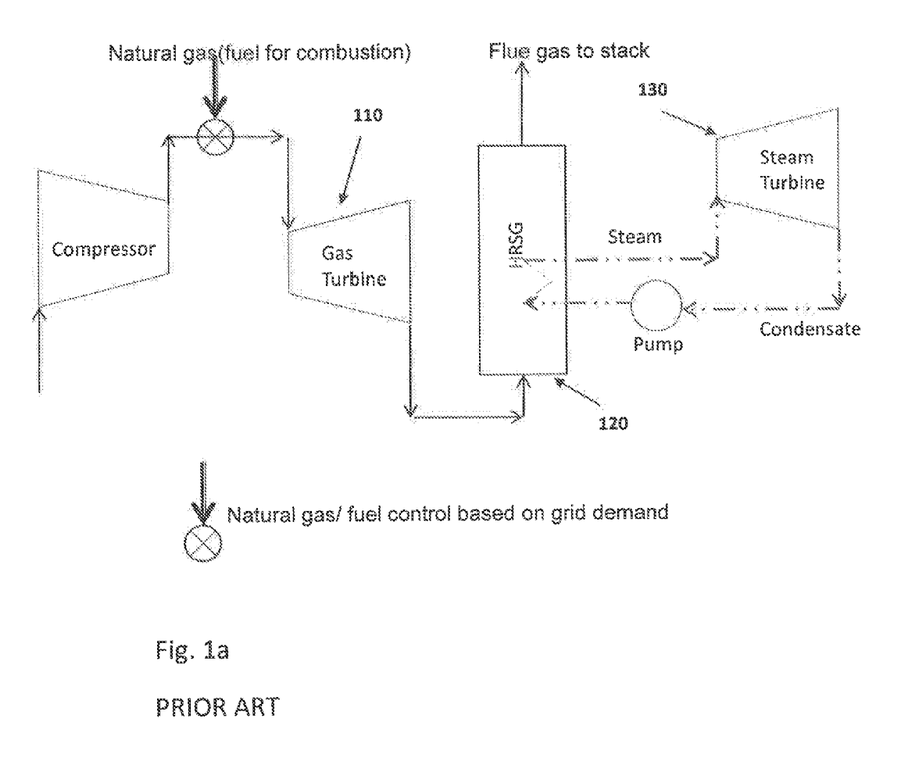
FIG. 1a is a schematic representation of a conventional combined cycle power plant.

One reason for the increased need for storage is that the technology for generating electricity has changed Standard combined cycle power plants(CCPP) used more commonly can be described by FIG. 1a. These plants provide a large fraction of the electric energy in the world and their use is growing fast (reaching over 20% of installed capacity in the U.S.). During normal operation, compressed air is introduced to a combustion chamber with natural gas or other fuel introduced in a controlled way. The high temperature (1100-1200° C.) gases which are produced as a result of this combustion are introduced to gas turbine 110. The exhaust gases after the expansion in the gas turbine 110 have much lower pressure (barely sufficient above atmospheric pressure in order to flow). The temperature of these exhaust gases is 550-600° C. resulting in the exhaust gases carrying high grade energy, which is recovered in a heat recovery steam generator (HRSG) 120 by generated steam in a separate cycle. The design of the HRSG 120 is such that the resultant back pressure to the gas turbine is very low (40-50 mBars). Therefore, providing the HRSG does not affect the efficiency of gas turbine and introduces capability of operating a steam Rankine cycle from the recovered heat. The efficiency of modern combined cycle power plants is almost 55-60%. The control of the power output from the plant is governed by the demand in the grid and is, in turn, effected via supply and consumption of natural gas/fuel in the combustion chamber. This results in changed output from the gas turbine 110 and the steam turbine 130.

In conventional combined cycle power plants (CCPP), gas turbines operate continuously and the main control of electricity output is obtained by adjusting the main feed to the gas turbines. Since gas turbines have a very low turn-down ratio, they can lose efficiency very rapidly when power is below maximum. The only control is basically on-off, as they can be shutdown in an hour and started up in one or two hours. The conventional CCPPs are not suitable for rapid load following for grid regulation and there is not enough overcapacity to enable such operation as a practical matter.

Therefore, it will be appreciated that there remains a need for new energy storage systems that can help address the above supply and control issues. There is also a need for storage systems that can operate while providing a resultant low back pressure.

BRIEF SUMMARY

Thermal storage systems that preferably do not create substantially any additional back pressure or create minimal additional back pressure and their applications are disclosed herein below.

In one embodiment of the method for efficient response to load variations in a combined cycle power plant of these teachings, the method includes providing, through a thermal storage tank, a flow path for fluid exiting a gas turbine, the flow path being enabled under predetermined conditions, placing in the flow path a storage medium comprising high thermal conductivity heat resistance media, preferably particles, the particles being in contact with each other and defining voids between the particles in order to facilitate flow of the fluid in a predetermined direction, the predetermined flow direction constituting a longitudinal direction, arrangement of the particles constituting a packed bed, dimensions of the particles and of the packed bed being selected such that a resultant back pressure to the gas turbine is at most a predetermined back pressure. The combined cycle power plant of these teachings efficiently responds to a decrease in load by enabling the flow path through the thermal storage tank and storage medium and providing at least a portion of the fluid exiting the gas turbine to the flow path.

In another embodiment, the thermal storage system of these teachings includes a container having a first port and a second port, wherein the first port receives fluid after heating and the second port allows exit of the fluid when the heat storage system is utilized in the storage mode, and a storage medium disposed in the container, the storage medium comprising high thermal conductivity heat resistance particles, the particles being in contact with each other and defining voids between the particles in order to facilitate flow of the fluid in a predetermined direction, the predetermined flow direction constituting a longitudinal direction, arrangement of the particles constituting a packed bed, dimensions of the particles and of the packed bed being selected such that a resultant back pressure is at most a predetermined back pressure.

In one instance, the system of these teachings includes a gas turbine receiving compressed air and fuel for combustion, a bypass control/connection component and a thermal storage subsystem of these teachings, the bypass control/connection component controlling flow of a portion of fluid exiting the gas turbine and flowing through the heat storage subsystem, the flow through the heat storage subsystem occurring under predetermined conditions.

Embodiments of the method of these teachings for satisfying peak power demand in a combined cycle power plant and an embodiment of a system to implement the method are also disclosed.

For a better understanding of the present teachings, together with other and further needs thereof, reference is made to the accompanying drawings and detailed description and its scope will be pointed out in the appended claims.

DETAILED DESCRIPTION

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range. However, any ranges not cited in the claims are only intended for illustration and not for limiting the range covered by our invention. Numerical values are cited for exemplary reasons and to identify embodiments and are not intended to limit the general concept of these teachings.

As used herein, "Biot number" refers to a ratio of the product of the heat transfer coefficient and a characteristic length, typically defined as the volume of the body divided by the surface area of the body, to the thermal conductivity of the body.

In one embodiment, the method of these teachings for efficient response to load variations in a combined cycle power plant includes providing, through a thermal storage tank, a flow path for fluid exiting a gas turbine, the flow path being enabled under predetermined conditions, placing in the flow path a storage medium having high thermal conductivity heat resistance particles, the particles being in contact with each other and defining voids between the particles in order to facilitate flow of the fluid in a predetermined direction, the predetermined flow direction constituting a longitudinal direction, arrangement of the particles constituting a packed bed, dimensions of the particles and of the packed bed being selected such that a resultant back pressure to the gas turbine is at most a predetermined back pressure. The method also includes efficiently responding to a decrease in load by enabling the flow path through the thermal storage tank and storage medium and providing at least a portion of the fluid exiting the gas turbine to the flow path.

Figure 1B:
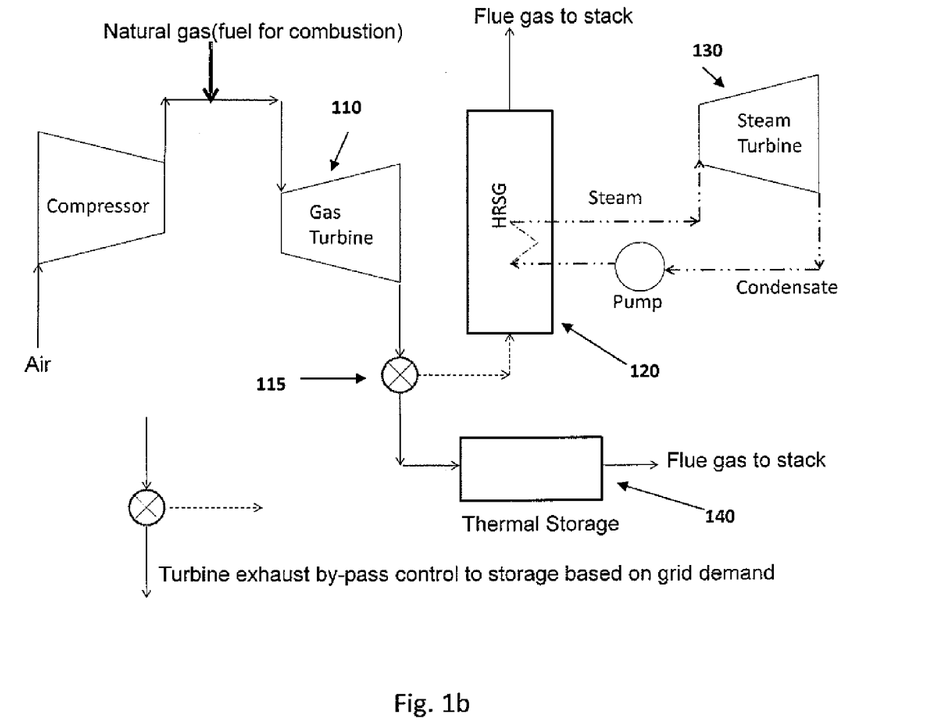
FIG. 1b is a schematic representation of a combined cycle power plant of these teachings in the storage mode.

FIG. 1b is a schematic diagram of a system for practicing the embodiment of the method of the teachings described hereinabove. In one embodiment of the method of these teachings, the efficiency of the gas turbine 110 is substantially maintained to the maximum level during all modes of grid demand operation. During load reduction times by the grid, the gas turbine power output is reduced as described hereinabove. The reduction in gas turbine power output is accompanied by major efficiency loss for the case of gas turbines when they are operated at lower power. In one embodiment of the method of these teachings, the gas turbine 110 is kept operating at substantially maximum power even during load reduction and the balance between supply and demand of power output is maintained by allowing the partial or complete flow of the exhaust gas through thermal storage modules 140. In this embodiment of the method of these teachings, gas turbine efficiency is maintained to maximum level and power produced by steam turbine (efficiency substantially does not change with power level) is varied. The diverted exhaust gas, normally used to produce steam through the HRSG 120, has energy which is transferred to the storage modules 140. The storage modules 140 of these teachings preferably do not create substantially any additional back pressure or create minimal additional back pressure to the gas turbine 110. (In one exemplary instance, not a limitation of these teachings, pressure of the gas entering the HRSG 120 during gas turbine operation is about 15 psi absolute pressure. The operation of the storage volume 140 should occur at substantially the same pressure.) The storage modules 140 of these teachings are designed in such a way to allow exhaust gas to be discharged back to the stack.

In another embodiment, the method of these teachings for satisfying peak power demand in a combined cycle power plant includes (a) providing a thermal storage medium in which thermal energy has been previously stored, the thermal storage medium comprising high thermal conductivity heat resistance particles, the particles being in contact with each other and defining voids between the particles in order to facilitate flow of a gas in a predetermined direction, the predetermined flow direction constituting a longitudinal direction, arrangement of the particles constituting a packed bed, dimensions of the particles and of the packed bed being selected in order to such that, during a storage phase, a resultant back pressure to a gas turbine is at most a predetermined back pressure, (b) flowing gas through the thermal storage medium; thereby obtaining, at an exit port of the thermal storage medium, heated gas, and (c) providing the heated gas to a heat recovery steam generator.

Steam is produced by the heat recovery steam generator and provided to a steam turbine to generate additional power to satisfy the peak power demand.

Figure 1C:
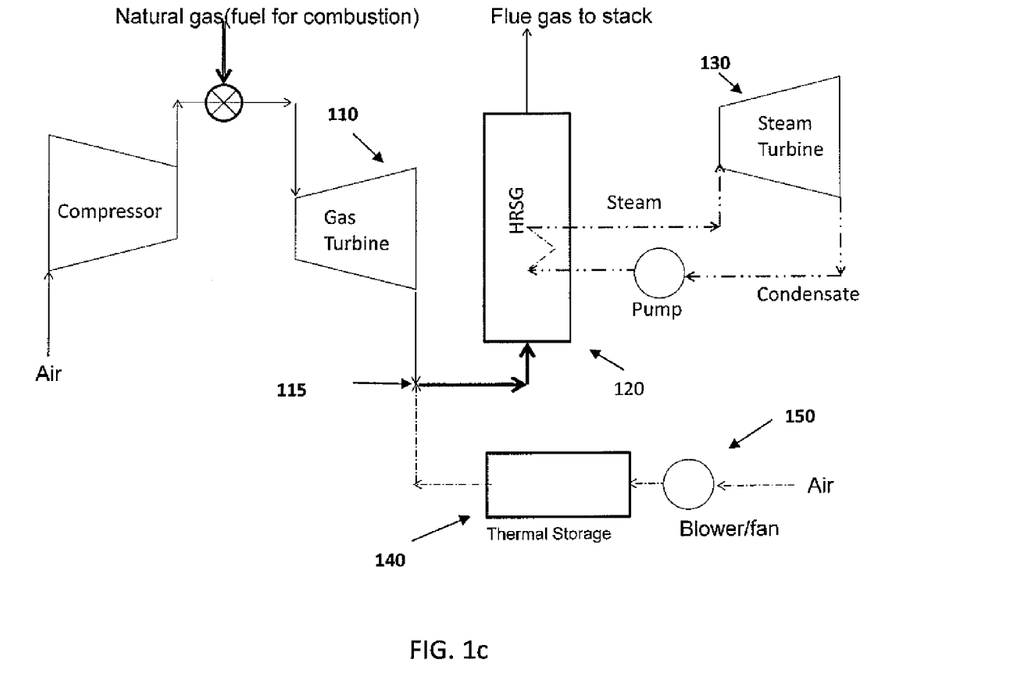
FIG. 1c is a schematic representation of a combined cycle power plan of these teachings in the recovery mode.

FIG. 1c is a schematic diagram of a system for practicing the embodiment of the method of the teachings for satisfying peak power demand in a combined cycle power plant, which is described hereinabove. During the peak demand the combined cycle power plant is expected to deliver stored energy to the grid in addition to its regular power rating. Thermal energy (heat) has been previously stored in the storage modules 140. The heat stored can be recovered by flowing gas, low pressure gas in one instance (air in one embodiment) through the storage modules 140. In one embodiment, a flow augmentation component such as fan or blower 150 is utilized to assist the flow of the gas. (Since the gas exiting the storage modules 140 is provided to the HRSG 120 in addition to the gas exiting the gas turbine 110, the gas exiting the storage module 140 should be at substantially the same pressure as the gas exiting the gas turbine 110. A low-pressure compressor or blower 150 is required.) The recovered hot gas exiting the storage modules 140 is introduced to the HRSG 120 to generate additional steam. In order to accommodate higher steam mass flow rate, either an additional steam turbine or a steam turbine 150 of higher capacity may be required. During the recovery process, the additional power delivered by the steam turbine enables the combined cycle power plant to satisfy the peak demand.

The system shown in FIGS. 1b and 1c includes a gas turbine 110 receiving compressed air and fuel for combustion, a bypass control/connection control component 115, a heat storage subsystem 140 having a container having a first port and a second port; wherein, when the heat storage system is utilized in the storage mode, the first port receives fluid exiting the gas turbine and the second port allows exit of the fluid when utilized in the storage mode and a storage medium disposed in the container. When the heat storage system is utilized in the recovery mode, the second port receives fluid from a fluid source and the first port, when utilized in the recovery mode, allows exit of the fluid and the fluid flows through a storage medium, in which thermal energy is stored, the storage medium being disposed in the container. The storage medium includes high thermal conductivity heat resistance particles; the particles are in contact with each other and define voids between the particles in order to facilitate flow of the fluid in a predetermined direction, the predetermined flow direction constituting a longitudinal direction. Arrangement of the particles constitutes a packed bed. Dimensions of in the particles and of the packed bed are selected such that a resultant back pressure to the gas turbine is at most a predetermined back pressure, the predetermined back pressure being such that the increase in back pressure to the gas turbine is minimal since any increase in gas turbine back pressure results in power losses. In the storage mode, the bypass control/connection control component 115 controls flow of a portion of the fluid exiting the gas turbine 110 through the heat storage subsystem 140. The system also includes a heat recovery steam generator 120 receiving heated gas and producing steam. In the recovery mode, the bypass control/connection control component 115 controls flow of fluid exiting the heat storage subsystem through the first port. In the recovery mode, fluid exiting the heat storage subsystem 140 through the first port is provided to the heat recovery steam generator 120. In one instance, in the recovery mode, the fluid exiting the thermal storage subsystem 140 is provided to the HRSG 120; in addition, the heated gas from the gas turbine 110 is also provided to the HRSG 120.

In one embodiment, the particles in the storage medium can be at least one of alumina, graphite, silica, quartz, or ceramic. In one instance, the dimensions and characteristics of the particles are selected such that Biot number magnitude does not exceed 0.1. In one embodiment of the storage medium of these teachings, alumina particles (e.g., stones or pebbles) are selected because their heat transfer resistance is low. The latter means that the thermal conductivity of the alumina is high and their size is small so the time needed to reach the temperature of the hot fluid stream is very short compared to the fluid residence time, and the temperature of the alumina thus follows that of the surrounding hot fluid practically instantaneously.

In one embodiment, to prevent heat transfer through the particles during storage, particularly when there are temperature gradients in the bed, in order to be able to heat slowly to very high temperature in the bed, insulating porous plates are placed, at intervals, inside the packed pebble bed, with holes small enough to retain the filling material. As will be appreciated by those skilled in the art, the heat up time of the solid particles is selected to be short.

The thermal storage system of these teachings differs from other thermal storage systems, such as the thermal storage systems disclosed in U.S. Pat. No. 7,954,321, issued on Jun. 7, 2011 to R. Shinnar, and in US Patent Application Publication 20090178409, "Apparatus And Method For Storing Heat Energy," published on Jul. 16, 2009, both of which are Incorporated by reference herein in their entirety for all purposes, in a variety of factors, among them being the requirement that storage modules of these teachings preferably do not create substantially any additional back pressure or create minimal additional back pressure.

Figure 2:
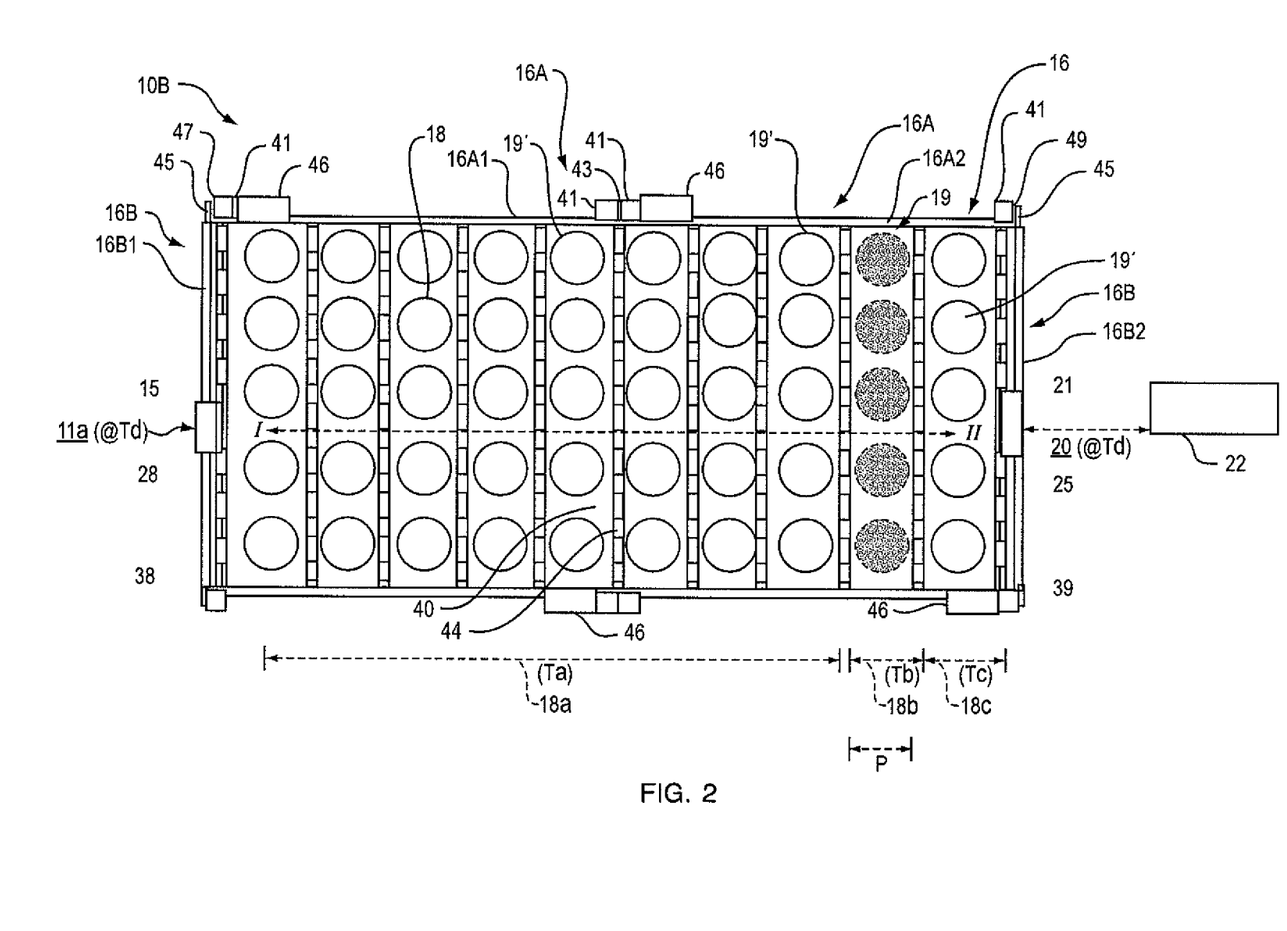
FIG. 2 is a cross-sectional view of a graphical representation of an embodiment of a heat storage subsystem of these teachings.

FIG. 2 shows the assembled modules in side cross-section with the packed (pebble) bed 19 loaded and filling the vessel interior from the vessel top to the vessel bottom, with flow path I-II extending through the medium 18 between the pebble material 19' of pebble bed 19. In one instance of these teachings, a single large storage vessel 16 can be used although smaller modules can be assembled to form the vessel. A single such module (in one instance, a 5-30 ft long section of pipe) is good for a small power plant, while a number of vessels can be assembled, in one instance, in parallel for a larger plant.

Referring again to FIG. 2, in an exemplary embodiment of these teachings, the storage vessel 16 includes preferably cylindrical modules 16A, with two modules 16A1 and 16A2 being vertically stacked and the closed vessel 16 being formed by addition of manifold plates 16B1 and 16B2 at the top 38 and bottom 39 respectively of vessel 16 on the respect outer ends of modules 16A1 and 16A2. Furthermore, Each module 16A is provided with a flange 41 at its top and bottom such that the mated modules can be and are sealed together at meeting adjacent flanges 41 to form seal 43, as indicated. A manifold plate 16B1 is placed at the top end of module 16A 1 such that manifold plate rim 45 cooperates with adjacent flange 41 to form seal 47 thereat and manifold plate 16B2 is placed at the bottom end of module 16A2 such that plate rim 45 cooperates with adjacent flange 41 to form seal 49, thus to provide a sealed storage container 16, as shown in FIG. 2. The cylindrical modules 16A, 16B of FIG. 2 preferably use sections of ready-made large diameter concrete vessels or vessels made directly by joining insulation bricks, each section of length that is easy to transport and to assemble (such as, in one instance, 5-7.5 ft long sections), and equipped with the provisions to assist assembly of the vessel on location. These modules 16A, 16B, etc., are preferably fitted with perforated plates 40 (FIG. 2), the holes 44 of which are smaller than the diameter of the storage material 19', to retain it in place. It will be appreciated that these plates can be, in one instance, made of non-conducting ceramic to minimize heat conduction through the storage material, since heat transfer is ideally restricted to direct contact between fluid 11a and pebble material 19'. It is desirable to limit conduction of heat particle to particle, and therefore, in one practice of these teachings, an insulating step, such as plates 40, is placed at intervals, the plates having enough porosity to permit fluid flow and small enough to hold the particles in place.

In one exemplary embodiment, the ceramic filling material 19' is constructed by using small balls of non-porous alumina 3-10 mm in diameter (preferably 6-8 mm), with the desired outcome being a fast heating medium. The diameter of the non-porous alumina balls is selected such that the Biot number magnitude does not exceed 0.1.

The configuration of the modular vessel and associated feed pipes forms a strong structure wherein the flanged pipe sections reinforce strength of the individual pipes to form a strong high structure that can be anchored to the ground. Modules (vessels) made of concrete or insulation bricks have diameter up to 15 ft and length 5-10 ft. (The vessel provides a container for the packed (pebble) bed.) These sections should be designed for easy assembly on location, but they can also be prepared on site. The short sections of the vessels make the process convenient such that they can be made and filled with the ceramic in a shop, and transported completely ready for final assembly. This can be less expensive than building large storage vessels on location.

In the system of these teachings, the heat transfer fluid is a low pressure gas, just above atmospheric conditions, which means energy density of the fluid is much lower as compared to the fluids used in steam systems or pressurized solar system. Therefore, rate of energy deposition using the low pressure fluids is lower. Heat storage methods are efficient only when the heat loss rate to the environment is minimal as compared to the heat storage or recovery rate. With low pressure gas, it is not-desirable to have larger length to diameter columns as it would result in substantial drop in the temperature stored and recovered, i.e. more than 10%. In one instance, a ratio of a characteristic dimension of the packed bed in a longitudinal direction (such as, for example, height) to a characteristic dimension of the packed bed in a direction transverse to the longitudinal direction (such as, for example, diameter) is at most about 3.0, preferably 2.15. Preferably, the height of column is from about 10 ft to about 15 ft. Moreover, in applications in combined cycle power plants, it is essential to have very small back-pressure acting on the gas turbine. The smaller length of the storage vessel helps in reducing back pressure. The diameter of the bed is increased in order to have increased total volume, preferably to about 15 ft. Another design consideration in storage vessels is the size of alumina particles. If the size of particles used in the packed bed is increased, the pressure drop or resultant back pressure on the turbine is reduced. But particle size can be increased only up to the point where Biot number magnitude does not become greater than 0.1 in order for the temperature inside the particles to equilibrate. Preferably, the size range of alumina particles is about 6 mm two about 8 mm.

Table 1 below illustrates an exemplary embodiment of the system of these teachings.

TABLE 1

| Flow rate (lbs/hr) | 1100000 |
| Length (ft) | 10 ft |
| Diameter (ft) | 15 ft |
| No. of Vessels | 14 |
| Utilization factor | 0.5 |
| Velocity (ft/sec) | 2 |
| Pressure drop packed bed (psi) | 0.325 |
| Pressure drop, piping | 0.166 |
| Storage capacity | 36 MWhr(e) |

In another embodiment, the storage modules are configured as disclosed in U.S. patent application Publication No. US20140299306 A1, corresponding to U.S. patent application Ser. No. 14/234,286, entitled "Optimum Process Design of Packed Bed Type Thermal Storage Systems And Other Applications," filed concurrently with the present application, and claiming priority of U.S. Provisional Patent Application No. 61/512,281, filed on Jul. 27, 2011, all of which are incorporated by reference herein in their entirety for all purposes.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It should be noted that although the storage systems of these teachings have been disclosed in relationship to a combined cycle power plant, the storage systems of these teachings are capable of other applications and those applications are within the scope of these teachings.

Although the teachings have been described with respect to various embodiments, it should be realized these teachings are also capable of a wide variety of further and other embodiments within the spirit and scope of the appended claims.

What is claimed is:

1. A method for efficient response to load variations in a combined cycle power plant, the method comprising the steps of:
   providing, through, a thermal storage tank, a flow path for fluid exiting a gas turbine; said flow path being enabled under predetermined conditions;
   placing in said flow path a storage medium comprising porous high thermal conductivity heat resistance media; said media defining voids in order to facilitate flow of said fluid in a predetermined direction; said predetermined flow direction constituting a longitudinal direction; arrangement of said media constituting a packed bed; dimensions of said media and of said packed bed being selected such that a resultant back pressure to the gas turbine is at most a predetermined back pressure; wherein said media comprise particles; and wherein the dimensions of said particles are selected such that Biot number magnitude does not exceed 0.1; wherein a ratio of a characteristic dimension of said packed bed in the longitudinal direction to a characteristic dimension of said packed bed in a direction transverse to the longitudinal direction is at most 2.15; said characteristic dimension of said packed bed in the direction transverse to the longitudinal direction being indicative of cross sectional area; said characteristic dimension of said packed bed in the direction transverse to the longitudinal direction, when said cross-sectional area is substantially circular, being a diameter; the characteristic dimension of said packed bed in the longitudinal direction being at most 4.57m; and
   efficiently responding to a decrease in load by enabling said flow path and providing at least a portion of the fluid exiting the gas turbine to said flow path.

2. The method of claim 1 wherein said particles comprise alumina; wherein said particles are spherical; and wherein a diameter of said particles is between about 6 mm to about 8 mm.

3. The method of claim 1 wherein said media comprise particles; and wherein said particles comprise at least one of alumina, graphite, silica, quartz, or ceramic.

4. A heat storage system for use in systems requiring low back pressure, the system comprising:
   a container having a first port and a second port; wherein said first port receives fluid after heating and said second port allows exit of said fluid when the heat storage system is utilized in the storage mode; and
   a storage medium disposed in said container; said storage medium comprising high thermal conductivity heat resistance particles; said particles being in contact with each other and defining voids between said particles in order to facilitate flow of said fluid in a predetermined direction; said predetermined flow direction constituting a longitudinal direction; arrangement of said particles constituting a packed bed; dimensions of said particles and of said packed bed being selected such that a resultant back pressure is at most a predetermined back pressure; wherein the dimensions of said particles are selected such that Biot number magnitude does not exceed 0.1; wherein a ratio of a characteristic dimension of said packed bed in the longitudinal dimension of said packed bed to a characteristic dimension of said packed bed in a direction transverse to the longitudinal direction is at most 2.15; said characteristic dimension of said packed bed in the direction transverse to the longitudinal direction being indicative of cross sectional area; said characteristic dimension of said packed bed in the direction transverse to the longitudinal direction, when said cross-sectional area is substantially circular, being a diameter; the characteristic dimension of said packed bed in the longitudinal direction being between about 3.048 m and about 4.57 m.

5. The heat storage system of claim 4 wherein said particles comprise alumina; wherein said particles are spherical; and wherein a diameter of said particles is between about 6 mm to about 8 mm.

6. The heat storage system of claim 4 wherein said particles comprise at least one of alumina, graphite, silica, quartz, or ceramic.

7. The heat storage system of claim 4 wherein said storage medium further includes heat insulating material; periodic insulating porous layers of said heat insulating material being placed in said flow path.

8. The heat storage system of claim 7 wherein the insulating layer comprises a plate with passages, said plate made of an insulating heat resistant material.

9. The heat storage system of claim 7 wherein said insulating layer comprises a layer of insulating heat resistant particles similar in size to the heat conducting material.

10. A system comprising:
a gas turbine receiving compressed air and fuel for combustion;
a bypass control connection component; and
a heat storage subsystem comprising;
a container having a first port and a second port; wherein said first port receives fluid exiting the gas turbine and said second port allows exit of said fluid when the heat storage subsystem is utilized in the storage mode;
a storage medium disposed in said container; said storage medium comprising high thermal conductivity heat resistance media; said media defining voids in order to facilitate flow of said fluid in a predetermined direction; said predetermined flow direction constituting a longitudinal direction; arrangement of said media constituting a packed bed; dimensions of said media and of said packed bed being selected such that a resultant back pressure to the gas turbine is at most a predetermined back pressure; wherein said media comprise particles; wherein the dimensions of said particles are selected such that Biot number magnitude does not exceed 0.1; wherein a ratio of a characteristic dimension of said packed bed in the longitudinal direction to a characteristic dimension of said packed bed in a direction transverse to the longitudinal direction is at most 2.15; said characteristic dimension of said packed bed in the direction transverse to the longitudinal direction being indicative of cross sectional area; said characteristic dimension, of said packed bed in the direction transverse, to the longitudinal direction, when said cross-sectional area is substantially circular, being a diameter; the characteristic dimension of said packed bed in the longitudinal direction being between about 3.048 m and about 4.57 m;
said bypass control/connection component controlling flow of a portion of fluid exiting said gas turbine and flowing through said heat storage subsystem occurring under predetermined conditions.

11. The system of claim 10 wherein said particles comprise alumina; wherein said particles are spherical; and wherein a diameter of said particles is between about 6 mm to about 8 mm.

12. The apparatus of claim 10 wherein said media comprise particles; and wherein said particles comprise at least one of alumina, graphite, silica, quartz, or ceramic.

13. The system of claim 10 wherein said storage medium further comprises heat insulating material; periodic insulating porous layers of said heat insulating material being disposed in said flow path.

14. The system of claim 1 wherein the insulating layer is a plate with passages, said plate made of an insulating heat resistant material.

15. The system of claim 13 wherein said insulating layer is a layer of insulating heat resistant particles similar in size to the heat conducting material.

16. A method for satisfying peak power demand in a combined cycle power plant, the method comprising the steps of:
providing a thermal storage medium in which thermal energy has been previously stored; the thermal storage medium comprising high thermal conductivity heat resistance particles; said particles being in contact with each other and defining voids between said particles in order to facilitate flow of a gas in a predetermined direction; said predetermined flow direction constituting a longitudinal direction; arrangement of said particles constituting a packed bed; dimensions of said particles and of said packed bed being selected such that, during a storage mode, a resultant back pressure to a gas turbine is at most a predetermined back pressure; wherein the dimensions of said particles are selected such that Biot number magnitude does not exceed 0.1; a ratio of a characteristic dimension of said packed bed in the longitudinal direction to a characteristic dimension of said packed bed in a direction transverse to the longitudinal direction, is at most 2.15; said characteristic dimension of said packed bed in the direction transverse to the longitudinal direction being indicative of cross sectional area; said characteristic dimension of said packed bed in the direction transverse to the longitudinal direction, when said cross-sectional area is substantially circular, being a diameter; the characteristic dimension of said packed bed in the longitudinal direction being between about 3.048 m and about 4.57 m;
flowing gas through the thermal storage medium; thereby obtaining, at an exit port of the thermal storage medium, heated gas; and
providing the heated gas to a heat recovery steam generator;
whereby steam is produced by the heat recovery steam generator and provided to a steam turbine to generate additional power to satisfy the peak power demand.

17. The method of claim 16 wherein said particles comprise alumina; wherein said particles are spherical; and wherein a diameter of said particles is between about 6 mm to about 8 mm.

18. The method of claim 16 wherein said particles comprise at least one of alumina, silica, graphite, quartz, or ceramic.

19. A system comprising:
a heat recovery steam generator receiving heated fluid and producing steam;
a connection control component; and
a heat storage subsystem comprising:
a container having a first port and a second port; wherein said first port receives fluid from a fluid source and said second port allows exit of said fluid when the heat storage subsystem is utilized in a recovery mode;
a storage medium disposed in said container; said storage medium comprising high thermal conductivity heat resistance particles; said particles being in contact with each other and defining voids between said particles in order to facilitate flow of said fluid in a predetermined direction; said predetermined flow direction constituting a longitudinal direction; arrangement of said particles constituting a packed bed; dimensions of said particles and of said packed bed being selected such that a resultant back pressure is at most a predetermined back pressure; wherein the dimensions of said particles are selected such that Biot number magnitude does not exceed 0.1; a ratio of a characteristic dimension of said packed bed in the longitudinal direction to the characteristic dimension of said packed bed in a direction transverse to the longitudinal direction, is at most 2.15; said characteristic dimension of said packed bed in the direction transverse to the longitudinal direction being indicative of cross sectional area; said characteristic dimension of said packed bed in the direction transverse to the longitudinal direction, when said cross-sectional area is substantially circular, being a diameter; the characteristic dimension of said packed bed in the longitudinal direction being between about 3.048 m and about 4.57 m;
said connection control component controlling flow of fluid exiting said heat storage subsystem through said second port; in the recovery mode, fluid exiting said heat storage subsystem through said second port is provided to said heat recovery steam generator.

20. The system of claim 19 wherein said particles comprise almina; wherein said particles are spherical; and wherein a diameter of said particles is between about 6 mm to about 8 mm.

21. The system of claim 19 wherein said particles comprise at least one of the alumina, silica, graphite, quartz, or ceramic.

22. The system of claim 19 wherein said storage medium further includes heat insulating material; periodic insulating porous layers of said heat insulating material being disposed in said flow path.

23. The system of claim 22 wherein the insulating layer is a plate with passages, said plate made of an insulating heat resistant material.

24. The system of claim 22 wherein said insulating layer is a layer of insulating heat resistant particles similar in size to the heat conducting material.

25. The system of claim 19 further comprising a flow augmentation component augmenting flow speed of the fluid from the fluid source entering the heat storage subsystem.

* * * * *

UNITED STATES PATENT AND TRADEMARK OFFICE
CERTIFICATE OF CORRECTION

| | |
|---|---|
| PATENT NO. | : 9,540,957 B2 |
| APPLICATION NO. | : 14/115174 |
| DATED | : January 10, 2017 |
| INVENTOR(S) | : Reuel Shinnar et al. |

Page 1 of 1

It is certified that error appears in the above-identified patent and that said Letters Patent is hereby corrected as shown below:

In the Claims

In Column 8, Line 15 (Claim 1), "providing, through, a thermal storage tank," should read
-- providing, through a thermal storage tank, --

In Column 9, Line 37 (Claim 10), "a bypass control connection component" should read -- a bypass control/connection component --

In Column 9, Line 38 (Claim 10), "a heat storage subsystem comprising;" should read -- a heat storage subsystem comprising: --

In Column 9, Lines 63-64 (Claim 10), "said characteristic dimension, of said packed bed" should read -- said characteristic dimension of said packed bed --

In Column 10, Line 19 (Claim 14), "The system of claim 1" should read -- The system of claim 13 --

In Column 10, Lines 45-46 (Claim 16), "in a direction transverse to the longitudinal direction, is at most 2.15;" should read -- in a direction transverse to the longitudinal direction is at most 2.15 --

Signed and Sealed this
Eighteenth Day of April, 2017

Michelle K. Lee
*Director of the United States Patent and Trademark Office*